United States Patent Office 3,238,232
Patented Mar. 1, 1966

3,238,232
ESTERS OF 17-BETA-HYDROXY-ANDROSTANES AND 17-BETA-HYDROXY-ESTRANES
Poul Borrevang, Vanlose, Copenhagen, Denmark, assignor to Novo Terapeutisk Laboratorium A/S, Copenhagen, Denmark
No Drawing. Filed Dec. 27, 1963, Ser. No. 334,020
Claims priority, application Great Britain, Feb. 21, 1963, 7,087/63
13 Claims. (Cl. 260—397.4)

The present invention relates to new steroid compounds of the androstane and estrane series having the general formula

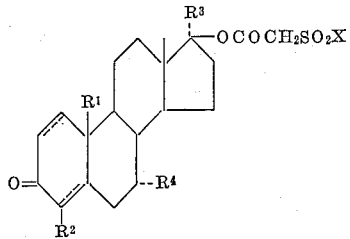

in which $R^1$ is selected from the group consisting of a hydrogen atom and a methyl group, $R^2$ is selected from the group consisting of one hydrogen atom (when there is a $\Delta^4$-double bond present), two hydrogen atoms (when no $\Delta^4$-double bond is present), a chlorine atom, and a hydroxyl group (when a $\Delta^4$-double bond is present), $R^3$ is selected from the group consisting of a hydrogen atom and an alkyl group, $R^4$ is selected from the group consisting of two hydrogen atoms and one hydrogen atom together with an α-methyl group and X is selected from the group consisting of a chlorine atom and an OR-group in which R is selected from the group consisting of alkyl, alkenyl, cycloalkyl, aryl, halogen substituted aryl, aralkyl, alkaryl, aryloxyalkyl, alkoxyaryl, and heterocyclic radicals.

As examples of the above alkyl radicals there may be mentioned methyl, ethyl, propyl, isopropyl, and butyl radicals. The alkenyl radical may be an allyl radical, and as examples of the cycloalkyl radicals cyclopentyl and cyclohexyl may be mentioned. The aryl radical, examples of which are phenyl and naphthyl radicals, may also be halogen substituted. Examples hereof are p-chlorphenyl and p-fluorphenyl radicals. As examples of the aralkyl and alkaryl radicals there may be mentioned benzyl, tolyl, and xylyl radicals. Phenoxyethyl and methoxyphenyl radicals are examples of the aryloxyalkyl and alkoxyaryl radicals. As an example of the heterocyclic radicals furfuryl may be mentioned.

When X in the above formula is chlorine there are provided new 17-chlorosulfonyl acetates which are intermediates in the preparation of the new 17-esters of 17-sulfoacetates of the androstane and estrane series of the above formula in which X stands for OR.

It has been found that the above new 17-esters possess valuable pharmacological properties. Thus, it is possible to obtain esters with widely different anabolic/androgenic indexes and pronounced prolonged effect by preparing the above compounds with different ester radicals R in the above general formula.

The androgenic and anabolic properties of the above new esters have been tested employing the method described by E. Eisenberg and C. S. Gordan in J. Pharmacol. Exptl. Therap., 99, 38 (1950).

Thus, the compounds to be tested were administered subcutaneously in different dosages to castrated male rats. After some time the weights of musculus levator ani (MLA), vesiculuae seminalis, and of prostata were determined. The weight of musculus levator ani is a measure of the anabolic effect, and the weights of vesiculae seminalis and of prostata are measures of the androgenic effect.

By employing testosterone propionate as a reference compound a potency index relative to this compound was calculated. Thus, if the tested compound is, for example, two times as anabolic and 0.2 times as androgenic as testosterone propionate, then the anabolic/androgenic index of the test compound is equal to 10.

In the following table the anabolic/androgenic indexes for some of the compounds according to the invention are stated, the reference compound being testosterone propionate.

TABLE I

| Esters of testosterone sulfoacetate: | Anabolic/androgenic index |
|---|---|
| Ethyl ester | 3 |
| Propyl ester | 1.5 |
| Cyclopentyl ester | About 2 |

| Ester of 5α-androst-1-ene-17β-ol-3-one sulfoacetate: | |
|---|---|
| Ethyl ester | 1.7 |

| Esters of 7α-methyl-testosterone sulfoacetate: | |
|---|---|
| Methyl ester | About 8 |
| Ethyl ester | About 14 |
| Phenyl ester | 7 |

| Esters of 19-nor-testosterone sulfoacetate: | |
|---|---|
| Methyl ester | ≧10 |
| Ethyl ester | 7–8 |
| Isopropyl ester | ≧9 |
| Phenyl ester | 15 |
| 2-phenoxyethyl ester | About 13 |

Furthermore, it has been found that several of these compounds possess a pronounced prolonged effect. Thus, it is possible to prepare compounds having either a prolonged androgenic effect or a pronounced prolonged anabolic effect, the androgenic effect at the same time being small. Besides, the compounds in question are in possession of their prolonged effect whether they are administered in oil solution or in the form of an aqueous suspension.

The prolonged effect has been tested by means of a method corresponding to the one mentioned above. However, in the following tests the compounds were administered in the form of a single dosage whereupon the organs referred to above were weighed after, for example, 1, 2, 3, 4, 5, 6, and 7 weeks.

In Table II the effect of the 2-phenoxyethyl ester of 19-nor-testosterone sulfoacetate has been compared with that of 19-nor-testosterone-β-phenyl propionate, and in Table III the effect of the above sulfoacetate ester has been compared with that of 19-nor-testosterone decanoate. Both of the two 19-nor-testosterone reference compounds have a prolonged anabolic effect.

TABLE II

| Compound tested | Dosage per animal, mg. | Weeks after injection | Number of animals | Organ weights in mg. (average) | | |
|---|---|---|---|---|---|---|
| | | | | Prostata | V. sem. | MLA |
| 19-nortestosterone-β-phenyl propionate in oil solution | 4 | 1 | 10 | 161.9 | 54.0 | 92.8 |
| | | 2 | 10 | 166.2 | 45.8 | 117.6 |
| | | 3 | 10 | 131.1 | 38.7 | 128.4 |
| | | 4 | 10 | 93.6 | 29.4 | 97.7 |
| 2-phenoxyethyl ester of 19-nor-testosterone sulfoacetate in aqueous suspension | 4 | 1 | 10 | 206.1 | 39.0 | 83.0 |
| | | 2 | 10 | 139.7 | 36.8 | 123.9 |
| | | 3 | 10 | 123.4 | 34.7 | 129.7 |
| | | 4 | 8 | 103.3 | 27.8 | 175.4 |
| 2-phenoxyethyl ester of 19-nor-testosterone sulfoacetate in oil solution | 4 | 1 | 10 | 113.9 | 33.3 | 74.6 |
| | | 2 | 9 | 154.2 | 39.0 | 127.8 |
| | | 3 | 9 | 88.0 | 21.6 | 130.4 |
| | | 4 | 9 | 113.3 | 27.3 | 175.4 |
| Control | | 1 | 10 | 39.0 | 6.4 | 46.3 |
| | | 2 | 9 | 47.3 | 6.2 | 49.3 |
| | | 3 | 7 | 33.6 | 5.9 | 48.5 |
| | | 4 | 10 | 33.8 | 5.8 | 42.6 |

TABLE III

| Compound tested | Dosage per animal, mg. | Weeks after injection | Number of animals | Organ weights in mg. (average) | | |
|---|---|---|---|---|---|---|
| | | | | Prostata | V. sem. | MLA |
| 19-nor-testosterone decanoate in oil solution | 4 | 1 | 9 | 92.6 | 27.8 | 65.8 |
| | | 2 | 10 | 96.5 | 29.5 | 88.2 |
| | | 3 | 10 | 76.7 | 13.6 | 89.2 |
| | | 4 | 10 | 100.8 | 28.0 | 136.1 |
| | | 5 | 10 | 97.8 | 20.0 | 128.7 |
| | | 6 | 10 | 90.4 | 20.2 | 146.2 |
| | | 7 | 10 | 64.4 | 14.5 | 132.5 |
| 2-phenoxyethyl ester of 19-nor-testosterone sulfoacetate in aqueous suspension | 4 | 1 | 10 | 58.5 | 14.1 | 65.9 |
| | | 2 | 10 | 57.6 | 12.4 | 79.0 |
| | | 3 | 10 | 94.1 | 18.5 | 124.9 |
| | | 4 | 10 | 126.4 | 33.4 | 147.0 |
| | | 5 | 10 | 131.8 | 39.1 | 158.4 |
| | | 6 | 10 | 157.4 | 66.9 | 172.1 |
| | | 7 | 10 | 155.3 | 79.5 | 198.5 |
| 2-phenoxyethyl ester of 19-nor-testosterone sulfoacetate in oil solution | 4 | 1 | 10 | 86.4 | 27.5 | 77.2 |
| | | 2 | 10 | 104.4 | 41.2 | 111.3 |
| | | 3 | 10 | 138.8 | 39.4 | 134.4 |
| | | 4 | 10 | 90.9 | 23.6 | 165.8 |
| | | 5 | 10 | 119.8 | 20.4 | 161.2 |
| | | 6 | 10 | 167.5 | 42.0 | 204.9 |
| | | 7 | 10 | 128.1 | 33.6 | 208.1 |
| Control | | 7 | 10 | 34.9 | 7.5 | 55.1 |

It clearly apears from the Tables II and III that the phenoxyethyl ester of 19-nor-testosterone sulfoacetate has a prolonged anabolic effect which is considerably greater than that of 19-nor-testosterone-β-phenyl propionate as well as 19-nor-testosterone decanoate whether the sulfoacetate is administered in oil solution or in the form of an aqueous suspension. The androgenic effect of the compound seems to correspond to that of 19-nor-testosterone-β-phenyl propionate, so that the anabolic/androgenic index by this comparison is considerably more favourable for the new compound. In comparison with 19-nor-testosterone decanoate the above new compound shows a slightly greater androgenic effect. However, since the anabolic effect is very much pronounced, it is to be expected that the anabolic/androgenic index is most favourable as regards the new ester, also.

It is seen from the following Tables IV and V that the p-methoxyphenyl ester and the 2-phenoxyethyl ester of testosterone sulfoacetate possess a pronounced androgenic effect.

As reference compounds there have been employed an aqueous crystal suspension of testosterone isobutyrate as well as an oil solution of testosterone enanthate. These two compounds are widely used as prolonged androgens.

TABLE IV

| Compound tested | Dosage per animal, mg. | Weeks after injection | Number of animals | Organ weights in mg. (average) | |
|---|---|---|---|---|---|
| | | | | Prostata | V. sem |
| Testosterone isobutyrate in aqueous crystal suspension | 4 | 1 | 10 | 191.8 | 69.3 |
| | | 2 | 10 | 347.8 | 187.2 |
| | | 4 | 10 | 134.5 | 39.2 |
| | | 8 | 10 | 102.9 | 35.1 |
| Testosterone enanthate in oil solution | 4 | 2 | 10 | 393.1 | 174.7 |
| | | 4 | 9 | 465.2 | 223.2 |
| | | 8 | 10 | 190.4 | 71.6 |
| p-Methoxyphenyl ester of testosterone sulfoacetate in aqueous suspension | 4 | 1 | 10 | 198.0 | 71.5 |
| | | 2 | 10 | 355.3 | 193.5 |
| | | 4 | 10 | 341.3 | 233.6 |
| | | 6 | 10 | 389.0 | 148.2 |
| | | 8 | 10 | 310.8 | 126.4 |

TABLE V

| Compound tested | Dosage per animal, mg. | Weeks after injection | Number of animals | Organ weights in mg. (average) | |
|---|---|---|---|---|---|
| | | | | Prostata | V. sem. |
| Testosterone isobutyrate in aqueous crystal suspension | 4 | 1 | 10 | 228.9 | 81.4 |
| | | 2 | 10 | 340.9 | 201.5 |
| | | 4 | 10 | 208.5 | 65.6 |
| | | 6 | 10 | 110.0 | 39.6 |
| | | 8 | 9 | 115.8 | 42.6 |
| 2-phenoxyethyl ester of testosterone sulfoacetate in aqueous suspension | 4 | 1 | 10 | 190.3 | 70.6 |
| | | 2 | 10 | 317.9 | 156.6 |
| | | 4 | 10 | 394.5 | 183.2 |
| | | 6 | 10 | 371.7 | 147.9 |
| | | 8 | 10 | 149.6? | 33.3 |
| 2-phenoxyethyl ester of testosterone sulfoacetate in oil solution | 4 | 1 | 10 | 190.8 | 77.0 |
| | | 2 | 10 | 362.9 | 149.6 |
| | | 4 | 10 | 480.5 | 213.0 |
| | | 6 | 10 | 391.3 | 116.8 |
| | | 8 | 10 | 70.8 | 15.8 |
| Control | | 8 | 10 | 41.3 | 7.0 |

It clearly appears from the above Tables IV and V that the new compounds constitute an improvement in relation to the reference compounds, since there is obtained a very high effect which remains practically constant for 2 to 6 or 2 to 8 weeks after the injection.

In preparing aqueous preparations for protracted use it is often necessary to prepare special suspensions containing very big crystals, for example, 100–150 microns. However, this measure is not necessary in connection with the new compounds of the present invention, because aqueous suspensions thereof give an excellent effect when containing crystals having a size of 10 to 20 microns, only. This small crystal size is advantageous in clinical use since the great crystals provide an increased risk of plugging of the cannula and also cause painful injections, unless special precautions are taken, e.g., addition of local anaesthetics.

According to the invention the new 17-esters of the androstane and estrane series may be prepared by one of the following methods: A steroid compound containing in the 17β-position a hydroxy group and otherwise having a configuration corresponding to the desired end product, e.g. testosterone or 19-nor-testosterone, may be reacted with chlorosulfonyl acetyl chloride and thereafter with a hydroxy compound to obtain the desired ester.

Also, androstendione protected at the $\Delta^4$-3-keto positions, e.g., by the formation of a 3-enolether, and reduced at the 17-position may be reacted with chlorosulfonyl acetyl chloride together with a compound of the formula HOR in which R is as defined above. As an example, testosterone-3-enolethylether may be reacted with chlorosulfonyl acetyl chloride and ethanol yielding the ethyl ester of testosterone-17-sulfoacetate.

Furthermore, a 3-alkoxy-17β-hydroxy-2,5(10)-estradiene may be reacted with chlorosulfonyl acetyl chloride and a compound of the above formula HOR. For example, when 3-methoxy-17β-hydroxy-2,5(10)-estradiene is reacted with chlorosulfonyl acetyl chloride and methanol the methyl ester of 19-nor-testosterone 17-sulfoacetate is prepared.

Another method for preparing the esters of testosterone-17-sulfoacetate comprises reacting testosterone with a Grignard-solution and treating the resulting 17-halomagnesium compound with chlorosulfonyl acetyl chloride and a compound of the above formula HOR. Thus, reaction of testosterone-17-bromomagnesium oxide with chlorosulfonyl acetyl chloride and ethanol yields the ethyl ester of testosterone-17-sulfoacetate.

The following examples illustrate the preparation of a number of the 17-chlorosulfonyl acetate compounds and esters of the 17-sulfoacetates.

*Example 1.—Testosterone chlorosulfonylacetate*

28.8 g. of testosterone and 10.6 g. of pulverized anhydrous $Na_2CO_3$ were added to 200 ml. of anhydrous benzene. A solution of 17.7 g. of chlorosulfonyl acetyl chloride in 200 ml. of anhydrous benzene was added to this suspension with stirring. Following stirring for one hour the reaction mixture was filtered and the filtrate evaporated to dryness in vacuo on a water bath. The solid residue was recrystallized from ethyl acetate. In this manner there was obtained 31.4 g. of testosterone chlorosulfonylacetate having M.P. 144–146° C.

A sample was recrystallized once more and gave an M.P. of 149–152° C. The ultra-violet spectrum showed a maximum at 231 m$\mu$ ($\epsilon$=18500) in ether.

*Analysis.*—Calculated for $C_{21}H_{29}ClO_5S$: C, 58.79%; H, 6.81%; S, 7.48%; Cl, 8.27%. Found: C, 58.88%; H, 6.83%; S, 7.52%; Cl, 8.33%.

*Example 2.—Methyl ester of testosterone sulfoacetate*

2.0 g. of testosterone chlorosulfonyl acetate were added to 10.0 ml. of methanol and heated to dissolution. After standing at 0° C. for a short time the separated crystals were filtered off. In this manner there was obtained 1.4 g. of the methyl ester having M.P. 147–149° C. After recrystallization from methanol an M.P. of 149–151° C. was obtained. The ultra-violet spectrum showed a maximum at 239 m$\mu$ ($\epsilon$=17600) in 96 percent ethanol.

*Analysis.*—Calculated for $C_{22}H_{32}O_6S$: C, 62.24%; H, 7.60%; S, 7.55%. Found: C, 62.33%; H, 7.61%; S, 7.50%.

The methyl ester may also be prepared directly by recrystallization from methanol of the residue obtained according to Example 1 after evaporation of the benzene.

*Example 3.—Ethyl ester of testosterone sulfoacetate*

The ethyl ester of testosterone sulfoacetate with M.P. 137–139° C. was obtained by recrystallization of the residue from Example 1 from ethanol. The ultra-violet spectrum showed a maximum at 240 m$\mu$ ($\epsilon$=18200) in 96 percent ethanol.

*Analysis.*—Calculated for $C_{23}H_{34}O_6S$: C, 62.99%; H, 7.81%; S, 7.31%. Found: C, 62.82%; H, 7.82%; S, 7.26%.

*Example 4.—n-Propyl ester of testosterone sulfoacetate*

The n-propyl ester was crystallized by recrystallization of testosterone chlorosulfonyl acetate from propyl alcohol, addition of a small amount of water after cooling, and then further cooling. After recrystallization from 80 percent aqueous propyl alcohol an M.P. of 67–68° C. was obtained. The ultra-violet spectrum showed a maximum at 240 m$\mu$ ($\epsilon$=17200) in 96 percent ethanol.

*Analysis.*—Calculated for $C_{24}H_{36}O_6S$: C, 63.69%; H, 8.02%; S, 7.08%. Found: C, 63.86%; H, 8.00%; S, 7.11%.

*Example 5.—Isopropyl ester of testosterone sulfoacetate*

After recrystallization of testosterone chlorosulfonyl acetate from isopropyl alcohol the isopropyl ester was obtained which after recrystallization from 96 percent ethanol showed an M.P. of 113–114° C. The ultra-violet spectrum showed a maximum at 240 mμ (ε=17200) in 96 percent ethanol.

*Analysis.*—Calculated for $C_{24}H_{36}O_6S$: C, 63.69%; H, 8.02%; S, 7.08%. Found: C, 63.97%; H, 8.11%; S, 6.94%.

*Example 6.—Cyclopentyl ester of testosterone sulfoacetate*

3.4 g. of testosterone chlorosulfonyl acetate were dissolved in 17.0 ml. of anhydrous methylene chloride. This solution was added to a suspension of 2.4 g. of anhydrous pulverized potassium acetate in 17.0 ml. of anhydrous methylene chloride and 3.6 ml. of cyclopentanol. Following vigorous stirring for one hour water was added and the methylene chloride phase was separated, washed with water, dried over $Na_2SO_4$ and evaporated to dryness. The residue was crystallized by the addition of ethyl acetate. The product was separated by filtration and in this manner there was obtained 1.2 g. of the cyclopentyl ester with M.P. 114–116° C. The ultra-violet spectrum showed a maximum at 239 mμ (ε=17700) in 96 percent ethanol.

*Analysis.*—Calculated for $C_{26}H_{38}O_6S$: C, 65.24%; H, 8.00%; S, 6.70%. Found: C, 65.36%; H, 8.02%; S, 6.70%.

*Example 7.—Cyclohexyl ester of testosterone sulfoacetate*

In a similar manner as described in Example 6 but using 4.2 ml. of cyclohexanol instead of cyclopentanol, there was obtained 1.6 g. of the cyclohexyl ester with M.P. 126–128° C. employing ethyl acetate. After recrystallization from methanol a M.P. of 128–130° C. was obtained. The ultra-violet spectrum showed a maximum at 240 mμ (ε=1800) in 96 percent ethanol.

*Analysis.*—Calculated for $C_{27}H_{40}O_6S$: C, 65.82%; H, 8.18%; S, 6.51%. Found: C, 65.64%; H, 8.21%; S, 6.43%.

*Example 8.—Phenyl ester of testosterone sulfoacetate*

3.4 g. of testosterone chlorosulfonyl acetate was dissolved in 17.0 ml. of anhydrous methylene chloride and the solution was cooled in a bath containing solid carbondioxide in acetone. 3.7 g. of phenol was dissolved in 18.0 ml. of anhydrous pyridine and this solution was also cooled. The former solution was added to the latter and the resulting solution was stirred vigorously. The mixture was then left at 2° C. for 16 hours. Thereafter, the mixture was poured into ice water with stirring. Following stirring for 1 hour the methylene chloride phase was separated and washed once with N HCl, thrice with water, and was then dried over $Na_2SO_4$ and evaporated to dryness in vacuo. The residue was dissolved in methanol and left in a refrigerator. After some time the separated product was separated by filtration. In this manner there was obtained 2.1 g. of the phenyl ester with M.P. 92–95° C. After recrystallization from methanol there was obtained a M.P. of 111–113° C. The ultra-violet spectrum showed a maximum at 240 mμ (ε=18100) in 96 percent ethanol.

*Analysis.*—Calculated for $C_{27}H_{34}O_6S$: C, 66.64%; H, 7.04%; S, 6.59%. Found: C, 66.45%; H, 7.04%; S, 6.70%.

*Example 9.—19-nortestosterone chlorosulfonyl acetate*

5.6 g. of 19-nortestosterone and 2.1 g. of pulverized anhydrous $Na_2CO_3$ were added to 40.0 ml. of anhydrous benzene. A solution of 3.5 g. of chlorosulfonyl acetyl chloride in 40.0 ml. of anhydrous benzene was added with stirring. After stirring for half an hour the solution was filtered and evaporated to dryness on a water bath in vacuo. Following addition of ethyl acetate and some ml. of petroleum ether the product was separated by filtration. In this manner there was obtained 6.0 g. of 19-nortestostrone chlorosulfonyl acetate having M.P. 135–140° C. After recrystallization from ethyl acetate there was obtained a M.P. of 145–147° C. The ultra-violet spectrum showed a maximum at 231 mμ (ε=18100) in ether.

*Analysis.*—Calculated for $C_{20}H_{27}ClO_5S$: C, 57.89%; H, 6.56%; Cl, 8.54%; S, 7.73%. Found: C, 58.14%; H, 6.61%; Cl, 8.64%; S, 7.66%.

*Example 10.—Methyl and ethyl esters of 19-nortestosterone sulfoacetate*

By recrystallization of 2.0 g. of the chlorosulfonyl acetate described in Example 9 from methanol there was obtained 1.8 g. of the methyl ester with M.P. 152–153° C. After another recrystallization there was obtained a M.P. of 154–155° C. The ultra-violet spectrum showed a maximum at 239 mμ (ε=18100) in 96 percent ethanol.

*Analysis.*—Calculated for $C_{21}H_{30}O_6S$: C, 61.44%; H, 7.37%; S, 7.81%. Found: C, 61.58%; H, 7.43%; S, 7.57%.

After recrystallization of 2.0 g. from ethanol there was obtained 1.7 g. of the ethyl ester having M.P. 120–121° C. After another recrystallization there was obtained a M.P. of 123–125° C. The ultra-violet spectrum showed a maximum at 239 mμ (ε=17700) in 96 percent ethanol.

*Analysis.*—Calculated for $C_{22}H_{32}O_6S$: C, 62.24%; H, 7.60%; S, 7.55%. Found: C, 62.28%; H, 7.59%; S, 7.68%.

These esters may be prepared more directly by employing the procedure of Example 9 but by adding, for example, 20.0 ml. of methanol to the benzene solution and stirring for three quarters of an hour. The solution was then washed thrice with water, dried and evaporated to dryness. To the solid residue ethyl acetate was added, and the product was separated by filtration. In this manner there was obtained 4.9 of the methyl ester.

*Example 11.—Isopropyl ester of 19-nortestosterone sulfoacetate*

1.5 g. of 19-nortestosterone chlorosulfonyl acetate was added to 4.5 ml. of isopropyl alcohol and the solution was stirred for 3 hours at room temperature. The product was separated by filtration. In this manner there was obtained 1.1 g. of the isopropyl ester having M.P. 85–90° C. After recrystallization from aqueous 60 percent acetone there was obtained a M.P. of 98–100° C. The ultra-violet spectrum showed a maximum at 239 mμ (ε=18200) in 96 percent ethanol.

*Analysis.*—Calculated for $C_{23}H_{34}O_6S$: C, 62.99%; H, 7.81%; S, 7.31. Found: C, 63.04%; H, 7.96%, S, 7.29.

*Example 12.—Phenyl ester of 19-nortestosterone sulfacetate*

14.0 g. of phenol was placed in a flask and was thereafter heated to the melting point. 12.0 g. of 19-nortestosterone chlorosulfonyl acetate was then added with stirring. When all the solids had dissolved in the phenol the solution was cooled in an ice bath and dry ammonia was fed. The temperature was kept at about 25° C. by now and then stopping the ammonia feed. After 15–20 minutes the ammonia feed was stopped and the suspension poured into water. The water was decanted from the separated oil which was washed with water by decanting several times. The oil was crystallized by the addition of ethanol. The product was separated by filtration. In this manner there was obtained 10.7 g. of the phenyl ester having M.P. 114–124° C. After recrystallization from 96 percent ethanol there was obtained a M.P. of 124–126° C. The ultra-violet spectrum showed a maximum at 239 mμ (ε=17900).

*Analysis.*—Calculated for $C_{26}H_{32}O_6S$: C, 66.07%; H, 6.83%; S, 6.79%. Found: C, 66.04%; H, 6.93%; S, 6.71%.

*Example 13.—Methyl ester of 7α-methyltestosterone sulfoacetate*

755 mg. of 7α-methyltestosterone and 263 mg. of pulverized anhydrous $Na_2CO_3$ were added to 10.0 ml. of anhydrous benzene. 422 mg. of chlorosulfonyl acetyl chloride in 5.0 ml. of anhydrous benzene was added with stirring. Following stirring for 25 minutes the mixture was filtered and 2.0 ml. of methanol was added. After standing for 2 hours the solution was shaken thrice with water. The benzene phase was dried over $Na_2SO_4$ and evaporated to dryness in vacuo. The residue was crystallized by the addition of a small amount of methanol, and the product was separated by filtration. In this manner there was obtained 410 mg. of the methyl ester of 7α-methyltestosterone sulfoacetate with M.P. 145–153° C. After recrystallization from methanol there was obtained a M.P. of 152–154° C. The ultra-violet spectrum showed a maximum at 242 m$\mu$ ($\epsilon$=17000) in 96 percent ethanol.

7.81%; S, 7.31%. Found: C, 62.85%; H, 7.74%; S, 7.32%.

*Example 14.—2-phenoxyethyl ester of testosterone sulfoacetate*

3.0 g. of testosterone chlorosulfonyl acetate was dissolved by heating to 70 to 80° C. in 5.0 ml. of 2-phenoxyethanol. The solution was cooled to room temperature, and dry ammonia was supplied whereby the temperature rose to about 60° C. When the ammonia had been supplied for a short space of time the temperature began to fall, and the supply was discontinued. Water was added, the mixture was stirred, and the water was decanted from the oil. This procedure was repeated twice, and finally acetone was added to the oil whereby crystals were obtained. These were filtered off, and in this manner there was obtained 2.8 g. of the 2-phenoxyethyl ester with M.P. 135–140° C. After recrystallization from acetone there was obtained a melting point of 138–140° C. The ultra-violet spectrum showed maxima at 222 m$\mu$ ($\epsilon$=15000) and at 240 m$\mu$ ($\epsilon$=17300) in 96 percent ethanol.

*Analysis.*—Calculated for $C_{29}H_{38}O_7S$: C, 65.63%; H, 7.22%; S, 6.04%. Found: C, 65.58%; H, 7.31%; S, 5.29%.

*Example 15.—p-Methoxyphenyl ester of testosterone sulfoacetate*

3.0 g. of testosterone chlorosulfonyl acetate was dissolved in 4.5 g. of p-methoxyphenol at about 65° C. At this temperature dry ammonia was supplied, whereby the temperature rose to about 80° C. When the ammonia had been supplied for a short space of time the temperature decreased to about 60° C., and the supply was discontinued. Water was added, the mixture was stirred, and the water was decanted. This procedure was repeated twice. To the resulting oil 99 percent ethanol was added whereby the oil crystallized. The crystals formed were filtered off, and in this manner there was obtained 2.3 g. of the p-methoxyphenyl ester with M.P. 148–150° C. After recrystallization from 99 percent ethanol the M.P. was 150–152° C. The ultra-violet spectrum showed a maximum at 228 m$\mu$ ($\epsilon$=21600) in 96 percent ethanol.

*Analysis.*—Calculated for $C_{28}H_{36}O_7S$: C, 65.09%; H, 7.02%; S, 6.21%. Found: C, 65.38%; H, 7.12%; S, 6.16%.

*Example 16.—2-phenoxyethyl ester of 19-nor-testosterone sulfoacetate*

27.0 g. of 19-nor-testosterone chlorosulfonyl acetate was dissolved in 45.0 ml. of 2-phenoxyethanol while slightly heating. The solution was placed in an ice bath, and dry ammonia was supplied with stirring in such a manner that the temperature was kept below 30° C. After half an hour the supply was discontinued, and water was added. Following thorough stirring the water was decanted and a fresh portion of water was added. This procedure was repeated. Finally, acetone was added whereby the oil was crystallized. The crystals were filtered off, and in this manner there was obtained 32.5 g. of the 2-phenoxyethyl ester with M.P. 131–141° C. After recrystallization from acetone there was obtained a melting point of 152–153° C. The ultra-violet spectrum showed maxima at 224 m$\mu$ ($\epsilon$=14600) and at 238 m$\mu$ ($\epsilon$=17600).

*Analysis.*—Calculated for $C_{28}H_{36}O_7S$: C, 65.09%; H, 7.02%; S, 6.21%. Found: C, 65.09%; H, 7.07%; S, 6.18%.

*Example 17.—p-methoxyphenyl ester of 19-nor-testosterone sulfoacetate*

By employing the method described in Example 15 there was obtained 1.2 g. of the p-methoxyphenyl ester with M.P. 93–96° C. from 3.0 g. of 19-nor-testosterone chlorosulfonyl acetate and 5.0 g. of p-methoxyphenol. After recrystallization from 99 percent ethanol a melting point of 96–99° C. was obtained. The ultra-violet spectrum showed a maximum at 228 m$\mu$ ($\epsilon$=23000) in 96 percent ethanol.

*Analysis.*—Calculated for $C_{27}H_{34}O_7S$: C, 64.52%; H, 6.82%; S, 6.38%. Found: C, 64.54%; H, 6.79%; S, 6.26%.

*Example 18.—methyl ester of 5α-androst-1-ene-17β-ol-3-one sulfoacetate*

1.4 g. ofr 5α-androst-1-ene-17β-ol-3-one and 530 mg. of pulverized aqueous $Na_2CO_3$ were suspended in 10.0 ml. of anhydrous benzene. With stirring there was added a solution of 885 mg. of chlorosulfonyl acetyl chloride in 10.0 ml. of anhydrous benzene. After stirring for 1 hour the solution was filtered, and the filtrate was evaporated to dryness in vacuo. By the addition of methanol the solid residue was dissolved, and after a short time crystals appeared. These were filtered off, and in this manner there was obtained 1.5 g. of the methyl ester having a M.P. of 160–163° C. After recrystallization from methanol a melting point of 171–172° C. was obtained. The ultra-violet spectrum showed a maximum at 231 m$\mu$ ($\epsilon$=11300) in 96 percent ethanol.

*Analysis.*—Calculated for $C_{22}H_{32}O_6S$: C, 62.24%; H, 7.60%; S, 7.55%. Found: C, 62.00%; H, 7.52%; S, 7.64%.

*Example 19.—Ethyl ester of 5α-androst-1-ene-17β-ol-3-one sulfoacetate*

When empolying the method described in Example 18, but using 75 percent ethanol instead of methanol the ethyl ester with M.P. 146–148° C. was obtained. The ultra-violet spectrum showed a maximum at 230 m$\mu$ ($\epsilon$=11500) in 96 percent ethanol.

*Analysis.*—Calculated for $C_{23}H_{34}O_6S$: C, 62.99%; H, 7.81%; S, 7.31%. Found: C, 63.14%; H, 7.79%; S, 7.28%.

*Example 20.—Phenyl ester of 5α-androst-1-ene-17β-ol-3-one sulfoacetate*

By treating the residue mentioned in Example 18 with phenol and ammonia as described in Example 12 the phenyl ester was obtained. This ester had a M.P. of 131–132° C. after recrystallization from methanol. The ultra-violet spectrum showed a maximum at 229 m$\mu$ ($\epsilon$=11100) in 96 percent ethanol.

*Analysis.*—Calculated for $C_{27}H_{34}O_6S$: C, 66.64%; H, 7.04%; S, 6.59%. Found: C, 66.70%; H, 6.84%; S, 6.58%.

*Example 21.—Ethyl ester of 7α-methyl-testosterone sulfoacetate*

4.0 g. of 7α-methyl-testosterone and 1.40 g. of pulverized anhydrous $Na_2CO_3$ were added to 50.0 ml. of anhydrous benzene. With stirring there was added 2.34 g. of chlorosulfonyl acetyl chloride in 25.0 ml. of anhydrous benzene. Following stirring for 1 hour there was washed quickly twice with water, each time with 50 ml. The benzene solution was dried over $Na_2SO_4$ and evaporated to dryness in vacuo. The residue, which consists of 7α-methyl-testosterone chlorosulfonyl acetate, was dissolved in a small amount of ethanol under reflux. After standing in the cold the separated compound was isolated by filtration. In this manner there was obtained 3.0 g. of the ethyl ester of 7α-methyl-testosterone sulfoacetate with M.P. 135–140° C. After recrystallization from ethanol a melting point of 136–140° C. was obtained. The ultra-violet spectrum showed a maximum at 242 mμ (ε=17400) in 96 percent ethanol.

*Analysis.*—Calculated for $C_{24}H_{36}O_6S$: C, 63.69%; H, 8.02%; S, 7.08. Found: C, 63.94%; H, 8.07%; S, 6.91%.

*Example 22.—Phenyl ester of 7α-methyl-testosterone sulfoacetate*

1.5 g. of raw 7α-methyl-testosterone chlorosulfonyl acetate (the residue described in Example 21) and 1.5 g. of phenol were treated as described in Example 12. The resulting oil was dissolved in benzene after washing out with water, dried and filtered through an alumina column. The filtrate was evaporated to dryness in vacuo and was dissolved in a small amount of ethanol. After standing in the cold the resulting crystals were separated by filtration. In this manner the phenyl ester with M.P. 93–97° C. was obtained. The ultra-violet spectrum showed a maximum at 242 mμ (ε=17400) in 96 percent ethanol.

*Analysis.*—Calculated for $C_{28}H_{36}O_6S$: C, 67.17%; H, 7.25%; S, 6.40. Found: C, 66.95%; H, 7.27%; S, 6.29%.

Among those further new 17-esters and intermediate chlorosulfonyl acetates which may be prepared in a similar manner as that described in the examples, the following may be mentioned:

Methyl ester of 17α-methyl-testosterone sulfoacetate, M.P. 125–126° C.;

$\lambda_{max.}^{96\% C_2H_5OH}$ 240 mμ; ε=18000

Ethyl ester of 17α-methyl-testosterone sulfoacetate, M.P. 120–121° C.;

$\lambda_{max.}^{96\% C_2H_5OH}$ 240 mμ; ε=17400

Isopropyl ester of 17α-methyl-testosterone sulfoacetate, M.P. 116–117° C.;

$\lambda_{max.}^{96\% C_2H_5OH}$ 240 mμ; ε=18200

Phenyl ester of 17α-methyl-androstane-17β-ol-3-one sulfoacetate; M.P. 142–143° C.

Methyl ester of androstane-17β-ol-3-one sulfoacetate; M.P. 160–161° C.

Ethyl ester of androstane-17β-ol-3-one sulfoacetate; M.P. 162–163° C.

Propyl ester of androstane-17α-ol-3-one sulfoacetate; M.P. 133–134° C.

Butyl ester of androstane-17β-ol-3-one sulfoacetate; M.P. 115–116° C.

Methyl ester of 1-dehydro-testosterone sulfoacetate; M.P. 155–156° C.;

$\lambda_{max.}^{96\% C_2H_5OH}$ 242 mμ; ε=16500

Ethyl ester of 1-dehydro-testosterone sulfoacetate; M.P. 145–146° C.;

$\lambda_{max.}^{96\% C_2H_5OH}$ 242 mμ; ε=16400

Methyl ester of 4-chloro-testosterone sulfoacetate; M.P. 165–166° C.;

$\lambda_{max.}^{96\% C_2H_5OH}$ 254 mμ; ε=34800

Methyl ester of 4-hydroxy-testosterone-17-sulfoacetate; M.P. 192–193° C. (decomposition);

$\lambda_{max.}^{96\% C_2H_5OH}$ 277 mμ; ε=13000

Androstane-17β-ol-3-one chlorosulfonyl acetate; M.P. 145–147° C.

1-dehydro-testosterone chlorosulfonyl acetate; M.P. 155–157° C.;

$\lambda_{max.}^{Ether}$ 242 mμ; ε=16500

What I claim is:

1. Steroid compounds of the androstane and estrane series having the formula

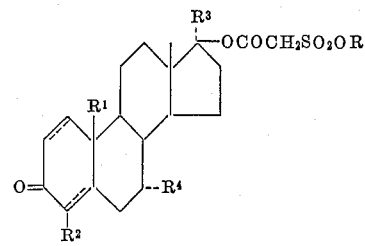

in which $R^1$ is selected from the group consisting of a hydrogen atom and a methyl group, $R^2$ is selected from the group consisting of one hydrogen atom (when there is a Δ⁴-double bond present), two hydrogen atoms (when no Δ⁴-double bond is present), a chlorine atom, and hydroxyl (when a Δ⁴-double bond is present), $R^3$ is selected from the group consisting of a hydrogen atom and lower alkyl, $R^4$ is selected from the group consisting of two hydrogen atoms and one hydrogen atom together with an α-methyl group, and R is selected from the group consisting of lower alkyl, cycloalkyl having 5 to 7 cyclic carbon atoms, phenyl, phenoxy-lower-alkyl and lower-alkoxy-phenyl.

2. 17-esters of testosterone sulfoacetate having the formula

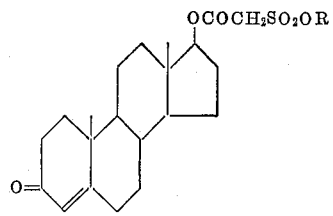

wherein R is selected from the group consisting of lower alkyl, cycloalkyl having 5 to 7 cyclic carbon atoms, phenyl, phenoxy-lower-alkyl and lower-alkoxy-phenyl.

3. 17-esters of 19-nor-testosterone sulfoacetate having the formula

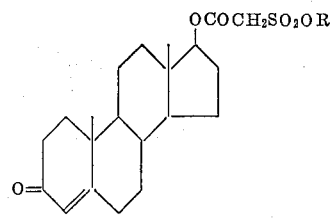

wherein R is selected from the group consisting of lower alkyl, cycloalkyl having 5 to 7 cyclic carbon atoms, phenyl, phenoxy-lower-alkyl and lower-alkoxy-phenyl.

4. 17-esters of 7α-methyl-testosterone sulfoacetate having the formula

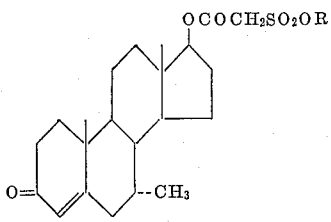

wherein R is selected from the group consisting of lower alkyl, cycloalkyl having 5 to 7 cyclic carbon atoms, phenyl, phenoxy-lower-alkyl and lower-alkoxy-phenyl.

5. 17-esters of 5α-androst-1-ene-17-ol-3-one sulfoacetate having the formula

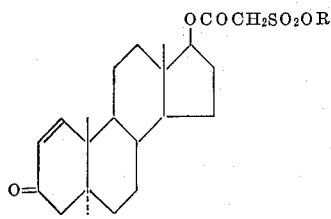

wherein R is selected from the group consisting of lower alkyl, cycloalkyl having 5 to 7 cyclic carbon atoms, phenyl, phenoxy-lower-alkyl and lower-alkoxy-phenyl.

6. Steroid compounds of the androstane and estrane series having the formula

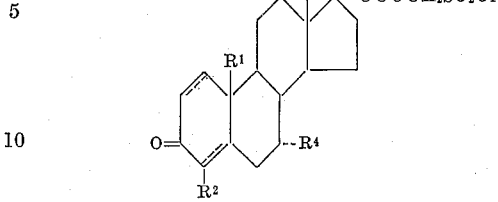

in which $R^1$ is selected from the group consisting of a hydrogen atom and a methyl group, $R^2$ is selected from the group consisting of one hydrogen atom (when there is a $\Delta^4$-double bond present), two hydrogen atoms (when no $\Delta^4$-double bond is present), a chlorine atom, and a hydroxyl group (when a $\Delta^4$-double bond is present), $R^3$ is selected from the group consisting of a hydrogen atom and a lower alkyl group, and $R^4$ is selected from the group consisting of two hydrogen atoms and one hydrogen atom together with an α-methyl group.

7. 2-phenoxyethyl ester of testosterone sulfoacetate.
8. p-Methoxyphenyl ester of testosterone sulfoacetate.
9. 2-phenoxyethyl ester of 19-nor-testosterone sulfoacetate.
10. p-Methoxyphenyl ester of 19-nor-testosterone sulfoacetate.
11. Ethyl ester of 7α-methyl-testosterone sulfoacetate.
12. Testosterone chlorosulfonyl acetate.
13. 19-nor-testosterone chlorosulfonyl acetate.

No references cited.

LEWIS GOTTS, *Primary Examiner.*

H. A. FRENCH, *Assistant Examiner.*